Patented Nov. 11, 1947

2,430,762

UNITED STATES PATENT OFFICE 2,430,762

FERROSILICON-MAGNETITE AS HEAVY MEDIA IN SEPARATION OF ORES

Louis J. Erck, Cooley, Minn., assignor to Minerals Beneficiation, Incorporated, Joplin, Mo., a corporation of Delaware No Drawing. Application June 12, 1944, Serial No. 539,989

6 Claims. (Cl. 209—166)

This invention relates to improved media for the beneficiation of ores by the sink and float process and to processes beneficiating ores using the media.

In the past the beneficiation of ores and other solids having constituents of varying specific gravities has been extensively effected in the so called heavy media which are suspensions of finely divided heavy solids in a liquid, usually water. The media thus prepared should be self substaining, that is to say, they should not settle out with the moderate agitation produced by recycling medium in the normal operation and they should not be too viscous to prevent the settling of heavy constituents. Various solids have been proposed for the production of heavy media. One of the early ones was galena. This material had many disadvantages, such as, softness and difficulty of reclaiming the galena from the wash water and cleaning the media which was normally effected by froth flotation.

A great improvement was introduced by Wade who used magnetizable media such as magnetite and ferrosilicon, cleaned by means of a magnetic cleaner and demagnetized cleaned medium solids before reuse. The Wade process is described in the Reissue Patent No. 22,191. So great was the improvement effected by the Wade process that the vast majority of heavy media plants put into operation in recent years use magnetizable media. However, in spite of the great advantage presented by magnetizable media certain problems remained.

In general, magnetizable medium solids may be roughly divided into three classes, ferrosilicon, magnetite and crushed iron or steel. Such material as roll scale partakes of characteristics of both magnetite and steel. Each class of medium solids has its advantages and disadvantages.

Ferrosilicon has high specific gravity which makes it readily possible to produce media having gravities up to 3.2 and even higher. The ferrosilicon generally used in heavy media separations shows a minor degree of oxidation and hydrolysis on contact with water, not enough, however, to prove detrimental to the process.

For the past several years, the cost of prepared ferrosilicon has increased to a point where even though the over all media loss is nominal, the cost reflected per ton of finished product was noticed.

Magnetite is hard, completely rust proof and in most localities very cheap. Its magnetic susceptibility varies but is in general adequate for cleaning even though often not quite so high as ferrosilicon. Properly prepared magnetite having the desired characteristics makes an ideal medium. The specific gravity of magnetite of relatively high iron content being approximately 5 places a limitation as to its applicability to heavy media separations. Comparing the magnetite gravity of 5 to that of ferrosilicon at 6.8 shows a large differential and that it is not practical to prepare media with magnetite as the solid where the gravity of the media is 3.0 or over. Unfortunately this gravity is needed with a large number of ores and a major portion of the field is therefore closed to magnetite.

Crushed steel or iron has high specific gravity, low cost, extremely high magnetic susceptibility but the rusting problem is so serious that its use is greatly restricted in many operations, and in some operations where the corrosive action of the water is high it is completely unusable.

It is, of course, possible to mix magnetite with ferrosilicon but when this is done a medium gravity is obtained which is lower than that obtainable with ferrosilicon, although, of course, higher than with magnetite alone. The gravities, in general, have been insufficient for a large number of operations so that ferrosilicon, in spite of its high price, has remained the only magnetizable solid for many operations.

According to the present invention it has been found that media can be produced containing ferrosilicon and magnetite and having gravities approaching those obtainable with pure ferrosilicon, and quite high enough for a large number of important ores. At the same time these media show excellent working characteristics, separation is sharp and the output is satisfactory. The present invention depends on the mixture of a normal fine ferrosilicon with a magnetite which is relatively much coarser and may be practically or completely free from fine particles. I have found that when these mixtures are made it is possible to have a sufficiently high concentration of coarse magnetite solids so that gravities are produced which are but little below those obtained with ferrosilicon alone. The coarse magnetite particles do not increase the viscosity of the medium to a point such that satisfactory separation does not take place. In fact, it is interesting to note that the magnetite alone is so coarse that in most cases it could not be used alone as a medium solid because it would not produce a self-sustaining medium.

In most cases the fine ferrosilicon appears to keep the coarser magnetite in suspension. The result of the combination is much greater than that which could be produced from the individual components, and it is possible to produce media which have working specific gravities as high as 3.35 with half of the medium consisting of magnetite. This compares with a maxium of only 3.16 when the magnetite is approximately the same size of ferrosilicon. Moreover, the media according to the present invention show improved working characteristics. The viscosity is very moderate and sharp separation and high output are readily obtained.

It will be appreciated that the magnetite which is usable with the finer ferrosilicon, such as the Electro Metalurigical Corporation, No. 65 to No. 100 ferrosilicon, may vary in its size distribution through fairly wide limits. In general, it is desirable to have not less than one-half of the magnetite coarser than 65 mesh and in no case should there be less than one-half of the magnetite coarser than 100 mesh. It is, also, desirable for maximum gravity that substantial quantities should be coarser than 48 mesh. However, good results can be obtained where most of the coarser particles of the magnetite are between 48 and 65 mesh. Excessive amounts of very fine particles should be avoided where higher gravities are desired as this will result in an increase in viscosity.

The proportion of magnetite to ferrosilicon may vary widely. It is, of course, best to use as large amounts of magnetite as possible and still obtain the desired gravities. While operative, therefore, relatively small amounts of magnetite do not present any worthwhile economic advantage over pure ferrosilicon. It is preferred, therefore, although the invention is not broadly so limited, to use at least 20 to 25% of magnetite. The top limit of magnetite presents a different question as it will vary with the gravity to be obtained. With gravities of between 3 and 3.10 satisfactory results are obtainable with proportions of coarser magnetite up to 60%. Where gravities are to be maintained continuously above 3.10 sharpness of separation and best output are obtained with mixed media which do not use more than about 50% of magnetite. Lower gravities, of course, will permit larger proportions of magnetite but when the gravity drops much below 3 it soon becomes possible to use media containing nothing but magnetite. It is within the range that cannot be produced with magnetite alone that the present invention has its real practical utility.

The present invention is concerned primarily with new media. It is an advantage that they can be used generally with ores which normally require a ferrosilicon medium and it is not intended to limit the invention to the beneficiation of any particular ore. It is also an advantage that the media of the present invention do not require changes in equipment nor do they require any new operating technique. New media are presented to the operator permitting him to obtain within a wide range results substantially identical with those obtained when ferrosilicon alone is used, and at the same time a material saving in medium cost is achieved. Since one of the advantages of the present invention is that the working characteristics of the media do not differ materially from those which obtain when ferrosilicon is obtained alone, each ore should be handled in the normal manner. Thus, for example, the type of equipment found to give the best results with ferrosilicon media should be used with the media of the present invention. Where closed type cones are preferred they may be used with the media of the present invention with the same efficiency as when ferrosilicon media are employed. With other ores where open type cones are sometimes preferred the media of the present invention should be used with this type of equipment.

The invention will be described in greater detail in the following specific examples which represent typical operations.

EXAMPLE 1

A magnetite concentrate from New York State containing about 67½% iron was ground to reduce the size of +28 mesh material. A product was obtained having the following screen size.

| Screen Size | Per cent wt. |
| --- | --- |
| +28 mesh | .07 |
| +35 mesh | 8.57 |
| +48 mesh | 18.07 |
| +65 mesh | 26.04 |
| +100 mesh | 17.54 |
| +200 mesh | 19.61 |
| −200 mesh | 10.10 |
| Total | 100.00 |

This was mixed with standard No. 65 ferrosilicon in the proportion of 75% ferrosilicon and 25% magnetite. This medium was used in a commercial plant beneficiating a Minnesota iron ore having 52% Fe, the feed being sized to −1¼ inch +⅛ inch. Excellent operation resulted, the gravity going as high as 3.20 but being maintained for the most part between 3 and 3.10. The metallurgical results were substantially identical with commercial operations with a pure ferrosilicon media.

During the operation of the plant the addition of ferrosilicon was stopped for several days and all make-up medium was magnetite. At the end of several days, the proportion of magnetite had risen to 60%. No difficulties were noted in separation and gravities up to 3.15 were maintained. The metallurgical results were identical with those obtained with pure ferrosilicon media.

EXAMPLE 2

The following table shows the results of a season's full scale commercial operation on a number of Minnesota iron ores. In every case the amount of magnetite was used which produced best commercial operation. The feed was sized in the customary manner to −1¼ inch +⅛ inch and the heavy media cone plant was of standard design for iron ore concentration and resembled that shown in the Wade reissue patent referred to above. The table, with the exception of the last two lines, deals with treatment of various fresh ores. The last two lines deal with jig tailings and straight washed concentrate respectively. The tonnage treated in the table was in excess of 700,000 tons producing over half a million tons of concentrate. As the gravity and proportions of the medium vary slightly during the season, ranges are given in the last two lines of the table:

| Feed | | Concentrate | | Recovery | Tailings | | Magnetite in Media | Sp. Gr. of Media |
|---|---|---|---|---|---|---|---|---|
| Iron | Silica | Iron | Silica | Iron | Iron | Silica | | |
| Per cent | Per cent | Per cent | Per cent | Per cent | Per cent | Per cent | Per cent | Per cent |
| 52.52 | 19.64 | 56.97 | 13.18 | 79.5 | 40.19 | 37.58 | 20-30 | 3.10-3.20 |
| 53.14 | 20.67 | 59.93 | 11.04 | 84 | 32.88 | 49.46 | 20-30 | 3.00-3.15 |
| 56.42 | 15.89 | 61.64 | 8.49 | 88.5 | 34.87 | 46.47 | 20-30 | 2.90-3.10 |
| 54.03 | 14.17 | 58.57 | 8.03 | 87 | 35.58 | 39.14 | 20-30 | 2.90-3.10 |
| 51.70 | 22.47 | 58.94 | 11.75 | 78 | 35.83 | 45.94 | 30-40 | 2.80-3.10 |
| 52.59 | 21.55 | 59.86 | 10.94 | 78 | 36.68 | 44.74 | 30-40 | 2.80-3.10 |
| 50.38 | 20.01 | 55.97 | 11.72 | 79 | 36.67 | 40.35 | 20-30 | 2.90-3.10 |
| 55.91 | 16.01 | 60.38 | 9.47 | 88.5 | 35.87 | 45.33 | 30-40 | 2.80-3.10 |

It will be noted that in every instance a concentrate of commercially useful grade was obtained with a high recovery.

EXAMPLE 3

In order to obtain more data on screen size variation, various mixtures of coarse magnetite and fine ferrosilicon were prepared and tested in a pilot plant open cone. The materials were commercial No. 65 ferrosilicon, deslimed −48 mesh magnetite, undeslimed −28 mesh magnetite and −65 mesh magnetite. The screen analyses of the materials are as follows:

In every case the top limits represent somewhat higher viscosities than are desired in actual practice. It will be noted that medium A, an ordinary mixture of fine ferrosilicon and fine magnetite will not go beyond 3.16 gravity, whereas medium B and medium C will reach 3.35 and 3.21 respectively. In other words, the media using coarse magnetite will operate in a practical range which cannot be reached with magnetite alone.

EXAMPLE 4

A typical garnet ore with a gangue composed

*Screen analyses*

| Mesh Tyler | #65 Ferrosilicon | | Deslimed −48 Mesh Magnetite | | −28 Mesh Magnetite | | −65 Mesh Magnetite | |
|---|---|---|---|---|---|---|---|---|
| | Per cent wt. Dist. | Cumulative per cent wt. Dist. | Per cent wt. Dist. | Cumulative per cent wt. Dist. | Per cent wt. Dist. | Cumulative per cent wt. Dist. | Per cent wt. Dist. | Cumulative per cent wt. Dist. |
| +28 | | | | | 0.01 | 0.01 | | |
| −28+35 | Nil | | Nil | | 12.94 | 12.95 | | |
| −35+48 | 0.15 | 0.15 | 5.73 | 5.73 | 23.35 | 36.30 | Nil | |
| −48+65 | 1.86 | 2.01 | 53.48 | 59.21 | 17.06 | 53.36 | 8.95 | 8.95 |
| −65+100 | 13.33 | 15.34 | 21.16 | 80.37 | 15.34 | 68.70 | 28.53 | 37.48 |
| −100+150 | 12.17 | 27.51 | 8.92 | 89.29 | 8.17 | 76.87 | 16.99 | 54.47 |
| −150+200 | 15.45 | 42.96 | 4.73 | 94.03 | 6.76 | 83.63 | 13.69 | 68.16 |
| −200+325 | 12.01 | 54.97 | 5.98 | 5.98 | 5.11 | 88.74 | 10.73 | 78.89 |
| −325 | 45.03 | 45.03 | Nil | | 11.26 | 11.26 | 21.11 | 21.11 |
| Total | 100.00 | | 100.00 | | 100.00 | | 100.00 | |

Four media were prepared. The first contained No. 65 ferrosilicon alone. The second, referred to as medium A, contained 50% ferrosilicon and 50% −65 mesh magnetite, the third, B, 50% ferrosilicon and 50% −28 mesh magnetite, and the fourth, C, 50% ferrosilicon and 50% −48 mesh deslimed magnetite. The gravities obtainable with these media were determined by specific gravity readings in a pilot plant open cone and are shown in the table as follows:

of hornblende and biotite was sized to produce a feed of −⅜ inch +10 mesh. The principal garnet mineral was alamandite.

Two series of tests were made with the above ore and with each of the four media. The first series maintained the media in the cone with a top gravity of 3.12. In the second series the top gravity was 3.05. In each case the sink was as-

*Specific gravity readings, 20″ cone*

| #65 Ferrosilicon | | | Medium B | | | Medium C | | | Medium A | | |
|---|---|---|---|---|---|---|---|---|---|---|---|
| Top | Bottom | Diff. | Top | Bottom | Diff. | Top | Bottom | Diff. | Top | Bottom | Diff. |
| 3.56 | 3.60 | 0.04 | 3.35 | 3.37 | 0.02 | 3.21 | 3.27 | 0.06 | 3.16 | 3.19 | 0.03 |
| 3.43 | 3.51 | 0.08 | 3.23 | 3.27 | 0.04 | 3.12 | 3.18 | 0.06 | 3.12 | 3.15 | 0.03 |
| 3.40 | 3.48 | 0.08 | 3.12 | 3.22 | 0.10 | 3.05 | 3.12 | 0.07 | 3.05 | 3.10 | 0.05 |
| 3.30 | 3.38 | 0.08 | 3.05 | 3.15 | 0.10 | 3.00 | 3.10 | 0.10 | 3.00 | 3.06 | 0.06 |
| 3.22 | 3.32 | 0.10 | 2.97 | 3.09 | 0.12 | 2.90 | 3.03 | 0.13 | 2.90 | 2.97 | 0.07 |
| 3.12 | 3.24 | 0.10 | 2.90 | 3.07 | 0.17 | 2.80 | 3.11 | 0.31 | 2.80 | 2.89 | 0.09 |
| 3.00 | 3.16 | 0.16 | | | | | | | 2.75 | 2.85 | 0.10 |
| 2.90 | 3.08 | 0.18 | | | | | | | 2.65 | 2.81 | 0.16 |
| 2.78 | 3.04 | 0.26 | | | | | | | 2.55 | 2.74 | 0.19 |
| | | | | | | | | | 2.50 | 2.76 | 0.26 | sayed and the float calculated by difference. The following table shows the metallurgical results:

|  | #65 Ferrosilicon | | | Medium A, 50%—65 Mesh Magnetite, 50% #65 Ferrosilicon | | |
| --- | --- | --- | --- | --- | --- | --- |
|  | Per Cent wt. | Per Cent Garnet | Per Cent Dist. | Per Cent wt. | Per Cent Garnet | Per Cent Dist. |
| −⅜″ + 10 M Cone Feed | 100.00 | 29.9 | 100.00 | 100.00 | 30.1 | 100.00 |
| Sink in 3.12 | 33.4 | 83.1 | 93.0 | 27.5 | 83.5 | 76.4 |
| Calc. Float on 3.12 | 66.6 | 2.4 | 7.0 | 72.5 | 9.8 | 23.6 |
| −⅜″ + 10 M Cone Feed | 100.00 | 29.9 | 100.00 | 100.00 | 30.1 | 100.00 |
| Calc. Sink in 3.05 | 39.6 | 74.6 | 98.0 | 39.1 | 73.7 | 95.7 |
| Float on 3.05 | 60.4 | 1.0 | 2.0 | 60.9 | 2.18 | 4.3 |

|  | Medium B, 50%—28 Mesh Magnetite, 50% #65 Ferrosilicon | | | Medium C, 50%—48 Mesh (deslimed) Magnetite, 50% #65 Ferrosilicon | | |
| --- | --- | --- | --- | --- | --- | --- |
|  | Per Cent wt. | Per Cent Garnet | Per Cent Dist. | Per Cent wt. | Per Cent Garnet | Per Cent Dist. |
| −⅜″ + 10 M Cone Feed | 100.00 | 31.1 | 100.00 | 100.00 | 31.1 | 100.00 |
| Sink in 3.12 | 28.1 | 94.0 | 84.9 | 32.3 | 88.0 | 91.3 |
| Calc. Float on 3.12 | 71.0 | 6.5 | 15.1 | 67.7 | 4.0 | 8.7 |
| −⅜″ + 10 M Cone Feed | 100.00 | 31.1 | 100.00 | 100.00 | 31.1 | 100.00 |
| Calc. Sink in 3.05 | 34.8 | 87.9 | 87.4 | 39.3 | 78.4 | 99.0 |
| Float on 3.05 | 65.2 | 0.77 | 1.6 | 60.7 | 0.43 | 1.0 |

It will be noted that when using a 3.12 gravity, which is preferable for maximum grade with ferrosilicon, the grade with medium A remains the same but there is about 18% drop in recovery. Medium B produces a much higher grade with only about 10% loss in recovery and medium C produces a substantially higher grade with very slight loss in recovery. The lower gravity of 3.05 gives almost quantitative recoveries with ferrosilicon but the grade is low. Medium A practically duplicates ferrosilicon while media B and C give materially improved grades.

EXAMPLE 5

An oxide zinc ore from Nevada consisting principally of cerrusite and Smithsonite with minor amounts of galena and calamine in a carbonaceous gangue was sized −1 inch plus 10 mesh and a series of tests with the four media were made using a top gravity of 2.9. The recoveries with media B and C were slightly better than with ferrosilicon alone. However, the results are good with medium A which shows that the advantages of the present invention lie primarily with the separation of ores which require gravities above 3.0.

While the media of the present invention are of general utility with ores requiring media in the gravity range for which the present media are suitable, the largest commercial field is found in the beneficiation of the so-called oxidized iron ores, that is to say, ores in which the major iron bearing minerals are oxides, hydro-oxides or carbonates. The term "oxidized iron ore" is used in the claims in this sense only.

In the claims the phrase "consisting essentially of magnetite and ferrosilicon" will be used to refer to media in which these two materials are the only essential components. In normal operation fine material from the ore will accumulate to some extent in separation media, and the term, therefore, will include media which contain minor portions of finely divided material from the ore or minor portions of other medium solids, so long as the magnetite and ferrosilicon are the only essential and major constituent solids of the media.

I claim:

1. A self-sustaining mixed heavy medium for the separation of ore constituents consisting essentially of a suspension in a liquid of a mixture of finely divided ferrosilicon and magnetite, the mixture containing from 20 to 60% of coarse magnetite having at least 50% of its weight in particle sizes coarser than 100 mesh.

2. A self-sustaining mixed heavy medium for the separation of ore constituents consisting essentially of a suspension in a liquid of a mixture of finely divided ferrosilicon and magnetite, the mixture containing from 20 to 60% of coarse magnetite having at least 50% of its weight in particle sizes coarser than 65 mesh.

3. A method of separating solids of different specific gravities by the sink and float process which comprises introducing the solids, of a size range suitable for sink and float separation, into a self-sustaining separating medium consisting essentially of a suspension in a liquid of a mixture of finely divided ferrosilicon and from 20 to 60% of coarse magnetite, the latter having at least 50% of its weight in particle sizes greater than 100 mesh, the specific gravity of the medium being slightly higher than at least one of the solids to be separated, permitting lighter particles to float and heavier to sink, and removing the separated products from the medium.

4. A method of separating solids of different specific gravities by the sink and float process which comprises introducing the solids, of a size range suitable for sink and float separation, into a self-sustaining separating medium consisting essentially of a suspension in a liquid of a mixture of finely divided ferrosilicon and from 20 to 60% of coarse magnetite, the latter having at least 50% of its weight in particle sizes greater than 65 mesh, the specific gravity of the medium being slightly higher than at least one of the solids to be separated, permitting lighter particles to float and heavier to sink, and removing the separated products from the medium.

5. A method according to claim 3 in which the solids to be separated are the constituents of an oxidized iron ore.

6. A method according to claim 4 in which the solids to be separated are the constituents of an oxidized iron ore.

LOUIS J. ERCK.

REFERENCES CITED

The following references are of record in the file of this patent:

UNITED STATES PATENTS

| Number | Name | Date |
| --- | --- | --- |
| Re. 22,191 | Wade | Sept. 29, 1942 |
| 1,462,881 | Chance | July 24, 1923 |
| 1,561,909 | Chance | Nov. 17, 1925 |
| 2,139,047 | Tromp | Dec. 6, 1938 |
| 2,373,635 | Wuensch | Apr. 10, 1945 |

OTHER REFERENCES

Bureau of Mines Technical Paper No. 403, pages 16 and 17.